March 2, 1965

R. D. SANBORN 3,171,968

POWER CONVERTER CIRCUIT

Filed June 10, 1960

INVENTOR.

Robert D. Sanborn

United States Patent Office 3,171,968
Patented Mar. 2, 1965

1

3,171,968
POWER CONVERTER CIRCUIT
Robert D. Sanborn, Marple, Pa.
(703 Winchester Road, Broomall, Pa.)
Filed June 10, 1960, Ser. No. 35,210
19 Claims. (Cl. 307—43)

The present invention relates to power converter circuits and more particularly to circuits for supplying power to a direct current load from an alternating current source.

It is known that, if a direct current motor is to be started slowly from a completely stopped condition, a more gradual acceleration of the rotor can be achieved if current is supplied to the motor in the form of regularly recurring pulses than if a steady current is supplied to the motor. It is thought that the vibration imparted to the rotor by the pulsating current may tend to minimize static bearing friction and other factors tending to hold the motor at rest. It is also known that it is generally undesirable to operate a direct current motor under load for any appreciable time from a pulsating power source since the useful power supplied to the shaft is a function only of the relatively low average value of the pulsating current whereas the resistive and hysteresis losses in the motor are a function of the peak amplitude of the pulsating current. More specifically the resistive and hysteresis losses are proportional to the root mean square of the instantaneous amplitude of the pulsating current.

If the direct current motor is to be supplied from an alternating current source, a suitable pulsating starting current may be obtained by the half wave rectification of the alternating current. The motor may also be operated on half wave rectified current. However a more suitable operating current may be obtained by the full wave rectification of the alternating current supply. That is, the resistive and hysteresis losses for a given power output will be less if the motor is supplied with full wave rectified current than if the motor is supplied with half wave rectified current since the amplitude of the alternating current ripple component to the direct current or average component is much lower for full wave rectified power than it is for half wave rectified power. It is difficult to switch from a half wave rectified starting source to a full wave rectified operating source while at the same time maintaining the same average value of current and hence the same speed or acceleration of the motor. For example, the change from half wave rectified starting current to full wave rectified operating current can be achieved by switching into the half wave starting circuit a second half wave rectifier which is supplied with alternating current energy of the appropriate phase. However this has the effect of abruptly changing the average current supplied to the motor. This difficulty has been partially overcome in the past by supplying the motor from a full wave rectifier through a rheostat or variable resistance which serves as the speed control for the motor. A second rheostat is placed in series with one of the two rectifier elements in a full wave rectifier circuit. This second rheostat is mechanically coupled or ganged to the first rheostat. If both rheostats are set to have a relatively large resistance, the first rheostat will limit the current supplied to the motor to a low value. The relatively large resistance of the second rheostat further limits the current through the rectifier element associated therewith to a small fraction of the current supplied by the other rectifier element. As a result the current supplied to the motor is effectively a half wave rectified current. As the resistances of both rheostats are decreased, more current is supplied to the motor and a proportionately greater share of the current is supplied by the rectifier element associated with the second rheostat. Therefore the current supplied to the motor approaches a full wave rectified current as the total current to the motor is increased.

Even this improved prior art system has several disadvantages. Uniform speed control usually requires that the resistance of the rheostats be a non-linear function of the control handle position. Usually the non-linear function is different for each rheostat. Further the first rheostat must carry the total current supplied to the motor while the second rheostat must carry at least one half the total motor current at the low resistance end of its range. As a result, there is a relatively large amount of power dissipated in the rheostats with an attendant heating of the rheostats and a resultant inefficiency of power conversion. The series resistance employed in prior art control circuits also tends to increase the effective internal impedance of the power source. This causes the system to have a relatively poor speed regulation as a function of applied load on the motor.

Therefore it is an object of the present invention to provide an improved circuit for supplying power to a direct current motor from an alternating current source.

Another object is to provide a low internal impedance power converter circuit which permits continuous, smooth control of average output power and a gradual change in the ratio of peak output current to average output current.

A further object is to provide a circuit for supplying power to a direct current motor or the like which provides a gradual transition from half wave rectified power to full wave rectified power as the total power output is increased.

Still another object of the present invention is to provide a power converter which has a relatively low internal impedance and a relatively low power dissipation.

In general these and other objects of the present invention are achieved by supplying appropriately phased variable amplitude alternating voltages to rectifier elements arranged in a full wave configuration and supplying an additional, opposing, variable amplitude alternating voltage to less than all of said rectifier elements by way of a substantially lossless circuit, the amplitude of said opposing voltage varying inversely as the amplitude of the first voltage. For a better understanding of the present invention together with other and further objects thereof, reference should now be made to the following description which is to be read in conjunction with the accompanying drawings in which:

Figure 1:
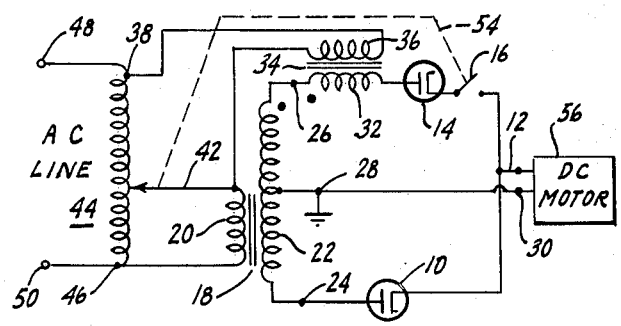
FIG. 1 is a schematic diagram of one preferred embodiment of the present invention.

In the circuit of FIG. 1 the cathode terminal of diode rectifier element 10 is connected to one output lead 12 of the power converter circuit. The cathode of the second diode rectifier element 14 is connected to this same output lead 12 by way of switch 16. Similar operation of the circuit will be achieved if both diodes 10 and 14 are reversed.

The power converter circuit further comprises a transformer 18 having a primary winding 20 and a secondary winding 22. Winding 22 is provided with two end terminals 24 and 26 and an intermediate terminal 28. Preferably terminal 28 is a center tap of the secondary winding 22. Terminal 28 is connected to the second output lead 30 of the power converter circuit. This lead 30 may be maintained at ground potential as shown in FIG. 1.

The terminal 24 of the secondary winding 22 is connected directly to the second electrode of rectifier element 10. The terminal 26 is connected to the second electrode of rectifier 14 through the secondary winding 32 of a second transformer 34. Thus secondary winding 22 acts as a first alternating current supply means for rectifier elements 10 and 14. Secondary winding 32 acts as a second alternating current supply means for rectifier 14 only. The primary winding 36 of transformer 34 is connected to one fixed tap 38 and the movable tap 42 of an adjustable auto transformer 44. Preferably tap 38 is placed at the limit of travel of tap 42 but some variation from this preferred position is permissible. The primary winding 20 of transformer 18 is connected between the movable tap 42 and a second fixed tap 46 of transformer 44. The input terminals 48 and 50 of transformer 44 may be connected to any suitable alternating current line. As shown in FIG. 1, tap 38 is at the same point on the winding as tap 48 and tap 46 is at the same point on the winding as tap 50. However this is not a necessary requirement of the present invention. Also, other forms of variable transformers may be employed such as transformers in which the secondary winding is rotated with respect to the primary winding to vary the output voltage. In transformers of this type it may be necessary to provide one secondary winding for supplying winding 20 of transformer 18 and a second secondary winding for supplying primary 36 of transformer 34.

Switch 16 is preferably ganged to movable tap 42 on transformer 44 as illustrated by the broken line 54. Switch 16 is arranged so that it is open when tap 42 is in the vicinity of tap 46 and closes as tap 42 moves toward tap 38. The point at which switch 16 closes will be described in more detail presently.

The output connections 12 and 30 of the power converter circuit may be connected to any suitable load. In FIG. 1 this load is represented by direct current motor 56.

The operation of the system in FIG. 1 will now be explained with reference to the graph of FIG. 2 and the waveforms of FIG. 3. It will be seen that if the position of tap 42 coincides with tap 38 the primary winding 36 will be short circuited. This will cause the impedance across secondary winding 32 to be very low. Thus for this position of tap 42 terminal 26 is, in effect, connected directly to the anode of diode 14. Switch 16 is closed if tap 42 is positioned in the vicinity of tap 38. As mentioned above, tap 28 is preferably a mid-tap of the secondary winding 22. Therefore symmetrical full wave operation of the circuit is obtained when the position of tap 42 coincides with tap 38. The voltage transformation ratios of transformers 44 and 18 are selected so that the desired maximum direct output voltage is supplied between leads 12 and 30 when tap 42 coincides with tap 38. It will be understood that this maximum direct voltage is the average component of the full wave rectified signal supplied by the circuit.

It can be seen that if switch 16 is open, half wave rectified current is supplied to the load by way of rectifier 10 only. Switch 16 is open when tap 42 is in the vicinity of tap 46.

The gradual transition from half wave operation to full wave operation depends upon the proper selection of the voltage supplied by winding 32 and the position of tap 42 at which switch 16 closes. Transformer 34 is selected so that the maximum output voltage from winding 32, which occurs when tap 42 is at tap 46, is a small fraction, for example 25%, of the maximum voltage appearing between terminals 26 and 28 with tap 42 at tap 38. If the power converter circuit is to be used with a particular motor which requires a known amplitude of half wave rectified current to cause it to start from rest, the optimum characteristics of transformer 34 may be more precisely defined. The turns ratio of transformer 34 is selected so that the potential appearing across secondary winding 32 is equal to or preferably 10% to 25% greater than the potential appearing between taps 26 and 28 at the setting of tap 42 which gives the required amplitude of half wave rectified current to start the motor.

Figure 2:
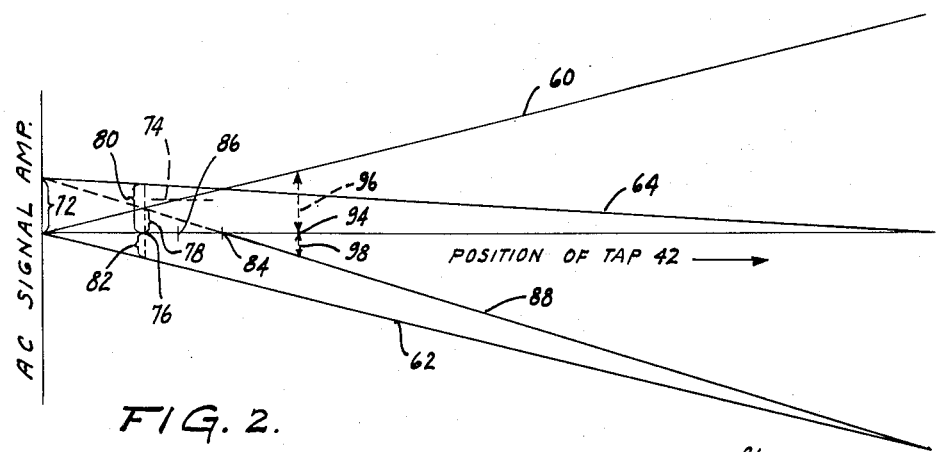
FIG. 2 is a graph showing certain voltage relationships present in the circuit of FIG. 1.

The voltages supplied by winding 32 and the two halves of winding 22 are shown in FIG. 2. The straight line 60 in FIG. 2 represents the peak amplitude of the alternating potential appearing between tap 24 and tap 28 as a function of the position of tap 42. The positive values in the graph of FIG. 2 represent alternating current signals of a first phase while negative values represent alternating current signals of the opposite phase. Line 62 in FIG. 2 represents the potentials appearing between tap 26 and tap 28 as a function of the position of tap 42. Line 64 represents the potential appearing across secondary winding 32 measured from the anode of diode 14 to terminal 26. Line 74 represents the amplitude of the half wave rectified voltage required to start motor 56 from rest.

Since rectifier element 10 is supplied only by the portion of secondary winding 22 between taps 24 and 28, this rectifier will function as a conventional half wave rectifier. Rectifier element 14 is supplied with the sum of the voltages appearing across winding 32 and the portion of winding 22 between terminals 26 and 28. It can be seen from FIG. 2 that if switch 16 were closed when tap 42 is at terminal 46, rectifier 14 would be supplied with a signal having an amplitude 72. This would be undesirable since motor 56 could never be completely deenergized by moving tap 42 to its lowermost position. Therefore switch 16 is coupled to tap 42 so that switch 16 is open when tap 42 is at terminal 46. The load is now completely deenergized if tap 42 is coincident with terminal 46.

Suppose that tap 42 is moved to the position represented by point 76 in FIG. 2. At this point the peak voltage supplied to rectifier 10 is represented by the amplitude 78. The net voltage supplied to rectifier element 14 is equal to the voltage 80 provided by transformer winding 32 less the voltage 82 supplied between terminals 26 and 28. It will be seen from FIG. 2 that this net voltage is equal in amplitude and is in phase with the voltage supplied to rectifier element 10. Therefore at this point switch 16 may be closed without affecting the current supplied to motor 56. If tap 42 is moved further toward terminal 48 but not beyond the point 84 in FIG. 2 the voltage supplied to diode 14 will be in phase with the voltage supplied to diode 10 but at an amplitude less than that supplied to diode 10. Therefore if switch 16 is closed, rectifier element 14 will be back-biased and will not conduct for positions of the tap 42 between points 76 and 84 of FIG. 2. Therefore switch 16 may be arranged to close at any position of tap 42 between the positions 76 and 84 of FIG. 2. It will be seen that as tap 42 is moved from position 76 toward position 84 at some position 86, the output voltage will exceed level 74 and motor 56 will start to rotate.

If tap 42 is advanced toward terminal 38 beyond the point represented by point 84 in FIG. 2, the potential appearing between tap 26 and tap 28 will exceed the potential appearing across the secondary winding 32. Therefore the net potential applied to rectifier 14 will be out of phase with that supplied to rectifier 10. This net potential is represented by the solid line 88 in FIG. 2. It will be seen that line 88 has a zero value at point 84 and a value equal to that of line 62 when tap 42 is positioned at terminal 38. Thus full wave rectification will occur for any position of tap 42 which is nearer to tap 38 than the position represented by point 84. However the conduction of rectifiers 10 and 14 will not be equal until tap 42 reaches tap 38.

Figure 3:
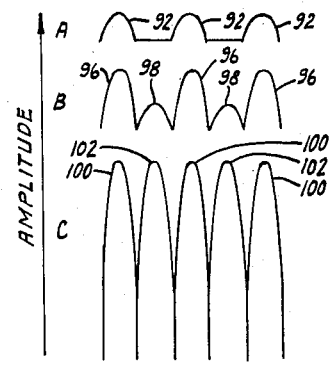
FIG. 3 is a series of waveforms illustrating the time variation of the current at the output of the system of FIG. 1.

Waveform A of FIG. 3 represents the signal supplied to motor 56 with tap 42 at the position represented by 86 in FIG. 2. The pulses 92 of waveform A are supplied solely by way of rectifier element 10. Waveform B in FIG. 3 represents the signal supplied to motor 56 with tap 42 at some intermediate position such as is represented by point 94 in FIG. 2. Pulses 96 are supplied to motor 56 by way of rectifier 10. Pulses 98 are supplied to motor 56 by way of rectifier element 14. The ratio of peak to average value for the waveform B of FIG. 3 will be less than for waveform A of FIG. 3. Waveform C in FIG. 3 represents the waveform of the signal supplied to motor 56 when tap 42 has been moved to a position coincident with tap 38. It will be seen from waveform C of FIG. 3 that the peaks 100 and 102 are of equal amplitude and correspond exactly to a conventional full wave rectified signal.

It should be obvious from the foregoing discussion that switch 16 may be omitted if the voltage supplied by winding 32 is made less than that necessary to maintain rotation of motor 56. This arrangement is subject to two disadvantages. It permits current to flow through the stopped motor and may cause the starting current to have the form shown in waveform B in FIG. 3 rather than the form shown in waveform A.

Figure 4:
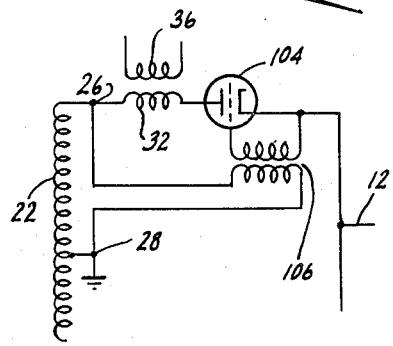
FIG. 4 is a schematic diagram showing a possible modification of the circuit of FIG. 1.

As shown in FIG. 4, switch 16 and rectifier 14 may be combined by substituting a triode rectifier element 104 for diode element 14. A signal in phase with the voltage appearing between terminals 26 and 28 is coupled between the grid and cathode of the triode rectifier element by transformer 106. Conduction will occur through the triode rectifier 104 only when the net voltage supplied to the anode of this rectifier element is in phase with the voltage appearing across the portion of winding 22 between terminals 26 and 28.

Figure 5:
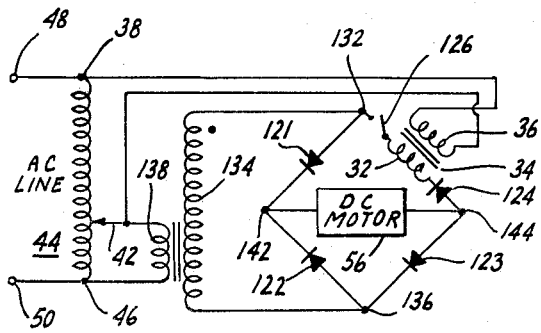
FIG. 5 is a schematic diagram of a second preferred embodiment of the present invention.

FIG. 5 is a schematic diagram of an embodiment of the invention employing a full wave bridge-type rectifier circuit. Transformers 34 and 44 correspond to the similarly numbered elements of FIG. 1. Terminals of transformer 44 and the windings of transformer 34 have been identified by the same numerals in FIG. 5 as in FIG. 1. Primary winding 36 of the transformer 34 is connected between terminal 38 and tap 42 as in FIG. 1. The four rectifier elements 121–124 are connected in a bridge-type rectifier which is conventional except for the fact that secondary winding 32 of transformer 34 and switch 126 are connected in series between rectifier element 124 and terminal 132. The secondary winding 134 of the main supply transformer is connected between terminals 132 and 136. The primary winding 138 of this transformer is connected between tap 42 and terminal 46. The load, which is again represented by the direct current motor 56, is connected between terminals 142 and 144 of the bridge rectifier circuit.

The bridge rectifier circuit of FIG. 5 provides full wave rectification with only one main transformer winding. It limits the voltage drop across each rectifier to only one-half that of supply 134.

The operation of the circuit of FIG. 5 is believed to be obvious from the foregoing description of the operation of the circuit of FIG. 1. The voltage across secondary winding 32 is in phase opposition to the voltage supplied to the series circuit comprising rectifier element 122, motor 56, rectifier element 124 and switch 126. The amplitude of this opposing voltage decreases as tap 42 is moved toward tap 38. Switch 126 prevents energy from being supplied to motor 56 from winding 32 when tap 42 is in its lowermost position.

It is to be understood that any convenient form of rectifying element may be employed in the circuits shown. Furthermore switch 16 of FIG. 1 or 126 of FIG. 5 may be coupled to the transformer 44 in any desired manner. For example, it may be mechanically coupled to a sliding tap on the transformer or coupled to the rotating shaft of a variable transformer. Alternatively, it may be a relay which has its winding energized by the connection of one terminal to tap 42 and the other terminal to an appropriate end terminal of the transformer winding 44.

Therefore while it has been described what are at present believed to be the preferred embodiments of the invention, it will be apparent that various modifications and other embodiments thereof will occur to those skilled in the art within the scope of the invention. Accordingly I desire the scope of my invention to be limited only by the appended claims.

I claim:

1. A power converter circuit comprising first and second alternating current supply means, each of said supply means having a low internal impedance, the maximum output voltage of said second supply means being substantially less than the maximum output voltage of said first supply means, voltage control means coupled to said first and second supply means for varying the output voltages of said supply means in opposite directions, first and second output terminals, means coupling said first supply means to said second supply means, first and second rectifier means coupling said first and second supply means to said output terminals, said rectifier means being arranged in a full wave configuration, one of said rectifier means being supplied with a voltage derived solely from said first supply means, the other of said rectifier means being supplied with a voltage which is the sum of the voltage supplied by said second supply means and a voltage equal to a predetermined fraction of the voltage supplied by said first supply means, the voltages supplied by said two supply means being of the same frequency but oppositely phased.

2. A power converter circuit comprising first and second alternating current supply means, each of said supply means having a low internal impedance, the maximum output voltage of said second supply means being substantially less than the maximum output voltage of said first supply means, voltage control means coupled to said first and second supply means for varying the output voltages of said supply means in opposite directions, first and second output terminals, means coupling said first supply means to said second supply means, first and second rectifier means coupling said first and second supply means to said output terminals, said rectifier means being arranged in a full wave configuration, one of said rectifier means being supplied with a voltage derived solely from one of said supply means, the other of said rectifier means being supplied with a voltage which is the sum of the voltage supplied by said second supply means and a voltage equal to a predetermined fraction of the voltage supplied by said first supply means, the voltages supplied by said two supply means being of the same frequency but oppositely phased, and means in circuit with said second rectifier means for interrupting current flow through said second rectifying means if the voltage supplied to said second rectifier means is in phase with and has a greater amplitude than the voltage supplied to said first rectifier means.

3. A power converter circuit as in claim 2 wherein said second supply means has a maximum output voltage substantially less than one half the maximum output voltage of said first supply means.

4. A power converter circuit as in claim 2 wherein said second supply means has a maximum output voltage equal to approximately one quarter the maximum output voltage of said first supply means.

5. A power converter circuit comprising first and second output terminals, first means adapted to supply a variable amplitude alternating voltage, rectifier means including at least first and second rectifier elements coupling said first means of alternating voltage to said first and second output terminals, said rectifier elements being arranged in a full wave configuration, and second means connected in series with one of said rectifier elements for providing a variable amplitude alternating voltage which has a frequency equal to the frequency of the voltage supplied by said first means and which is in phase opposition to the voltage supplied by said first means, third means coupled to said first and second means for varying the amplitude of the voltages supplied thereby, the amplitude of the voltage supplied by said second means varying in opposite direction to the variations in amplitude of the voltage supplied by said first means.

6. A power converter circuit comprising a first alternating current supply means having first, second and third terminals, the voltage from said first terminal to said second terminal being substantially equal in amplitude but opposite in phase to the voltage from said third terminal to said second terminal, a second alternating current supply means, the maximum output voltage of said second supply means being substantially less than the maximum output voltage of said first supply means measured between said first and second terminals thereof, control means coupled to said first and second supply means for varying the amplitudes of the output voltages supplied by said two supply means in opposite directions, first and second output terminals, a first rectifier element coupling said third terminal of said first supply means to said first output terminal, means including a second rectifier element and said second supply means connected in series circuit, said last-mentioned means coupling said first terminal of said first supply means to said first output terminal, said second supply means being connected in phase opposition to said first supply means, and means coupling said second output terminal to said second terminal of said first supply means.

7. A power converter circuit as in claim 6 wherein said two rectifier elements are diode rectifier elements and wherein said means including said second rectifier element includes a switch means connected in series circuit with said second rectifier element, said switch means being coupled to said control means for actuation thereby.

8. A power converter circuit as in claim 6 wherein said second rectifier element is a phased control rectifier element, said power converter circuit including means coupled to said first supply means and said phase controlled rectifier elements for limiting conduction through said second rectifier element to selected half cycles of the voltage supplied by said first supply means.

9. A power converter circuit as in claim 6 wherein said second rectifier element is a triode rectifier element, said power converter circuit including means coupled to said first supply means and the grid-cathode circuit of said triode rectifier element for supply a control voltage to said triode rectifier element.

10. A power converter circuit comprising four rectifier elements connected in a full wave, four-arm bridge configuration, first means adapted to supply an alternating voltage connected to a first pair of opposite terminals of said bridge configuration, first and second output terminals connected to a second pair of opposite terminals of said bridge configuration, and second means adapted to supply an alternating voltage connected in series with one of said rectifier elements in said bridge configuration, said second means providing an alternating voltage which has a frequency equal to the frequency of the voltage supplied by said first means and which is in phase opposition to the voltage supplied to the rectifier element in series therewith by said first means, control means for varying the amplitudes of the voltages supplied by said first and second means in opposite directions, the maximum output voltage of said second means being substantially less than the maximum output voltage supplied by said first means.

11. A power converter circuit comprising first and second transformers, each transformer having a primary winding and a secondary winding, means coupled to said primary winding of said first transformer and to the primary winding of said second transformer for supplying alternating current energy thereto, said last-mentioned means including means for varying the amplitude of the voltages impressed across said two primary windings simultaneously and in opposite directions, the amplitudes of the voltages impressed across said primary windings being such that the maximum output voltage of said secondary winding of said second transformer is substantially less than the maximum output voltage of said secondary winding of said first transformer, first and second output terminals, first and second rectifier means coupling said secondary windings of said first and second transformers to said output terminals, said rectifier means being arranged in a full wave configuration, a first one of said rectifier means being supplied with a voltage derived solely from said secondary winding of said first transformer, the other of said rectifier means being supplied with a voltage representative of the combined voltages of said secondary windings of said first and second transformers, the voltages impressed by said two secondary windings on said other rectifier means being oppositely phased.

12. A power converter circuit in accordance with claim 11, said power converter circuit further comprising means in circuit with said other rectifying means for interrupting current flow through said other rectifying means for the condition that the voltage supplied to said other rectifier means is in phase with and has a greater amplitude than the voltage supplied to said first rectifier means.

13. A power converter circuit as in claim 12 wherein said secondary winding of said second transformer has the maximum output voltage equal to approximately one quarter the maximum output voltage of said primary winding of said first transformer.

14. A power converter circuit comprising a first transformer having a primary winding and a secondary winding, said secondary winding having first, second and third terminals, the voltage from said first terminal to said second terminal being substantially equal in amplitude but opposite in phase to the voltage from said third terminal to said second terminal, a second transformer having a primary winding and a secondary winding, means coupled to said primary winding of said first transformer and to the primary winding of said second transformer for supplying alternating current energy thereto, said last-mentioned means including means for varying the amplitude of the voltages impressed across said two primary windings simultaneously and in opposite directions, the amplitudes of the voltages impressed across said two primary windings being such that the maximum output voltage of said secondary winding of said second transformer is less than the maximum output voltage of said secondary winding of said first transformer measured between said first and second terminals thereof, first and second output terminals, a first rectifier element coupling said third terminal of said secondary winding of said first transformer to said first output terminal, means including a second rectifier element and said secondary winding of said second transformer connected in series circuit, said last-mentioned means coupling said first terminal of said secondary winding of said first transformer to said first output terminal, said secondary winding of said second transformer being connected so that the voltage output thereof is in phase opposition to the voltage output of said secondary winding of said first transformer, and means coupling said second terminal of said secondary winding of said first transformer to said second output terminal.

15. A power converter circuit as in claim 14 wherein said means including said second rectifier element includes a switch means connected in series circuit with said second rectifier element, said switch means being coupled to said means for supplying alternating current energy to said first and second transformers for actuation thereby.

16. A power converter circuit as in claim 14 wherein said second rectifier element is a triode rectifier element, said power converter circuit including means coupled to said first transformer and the grid-cathode circuit of said triode rectifier element for supplying a control voltage to said triode rectifier element.

17. A power converter circuit comprising a first transformer having a primary winding and a secondary winding, said secondary winding having first, second and third terminals, a second transformer having a primary winding and a secondary winding, a variable voltage source providing a first output signal between a first pair of terminals and a second output signal between a second pair of terminals, said variable voltage source including means for varying the amplitudes of the signals appearing at said first and second pairs of terminals simultaneously and in opposite directions, said primary winding of said first transformer being coupled across said first pair of terminals, said primary winding of said second transformer being coupled across said second pair of terminals, first and second output terminals, a first rectifier element coupling said third terminal of said secondary winding of said first transformer to said first output terminal, means including a second rectifier element and said secondary winding of said second transformer connected in series circuit, said last-mentioned means coupling said first terminal of said secondary winding of said first transformer to said first output terminal, said secondary winding of said second transformer being connected so that the voltage appearing thereacross is in opposition to the voltage appearing between said first terminal and said second terminal of said secondary winding of said first transformer, and means coupling said second output terminal to said second terminal of said secondary winding of said first transformer.

18. A power converter circuit as in claim 17 wherein said means including said second rectifier element includes a switch means connected in series circuit with said second rectifier element, said switch means being coupled to said variable voltage source for actuation thereby.

19. A power converter circuit as in claim 17 wherein said second rectifier element is a signal controlled rectifier element, said power converter circuit including means coupled to said first transformer and said signal controlled rectifier element for limiting conduction through said second rectifier element to selected half cycles of the signal supplied by said first transformer.

References Cited by the Examiner
UNITED STATES PATENTS 2,995,215 10/60 Eisen et al. _____ 307—146
3,019,369 1/62 Zarleng _____ 310—146 X LLOYD McCOLLUM, *Primary Examiner.*

MILTON O. HIRSHFIELD, *Examiner.*